United States Patent
Bull et al.

(10) Patent No.: US 7,289,688 B2
(45) Date of Patent: Oct. 30, 2007

(54) PASSIVE METHOD AND APPARATUS FOR INDUCING MODE CONVERSION

(75) Inventors: Jeffrey D. Bull, Vancouver (CA); Nicolas August Fleming Jaeger, Vancouver (CA); Hiroshi Kato, Vancouver (CA); David Rolland Blaine Seniuk, Vancouver (CA)

(73) Assignee: Versawave Technologies Inc., Burnaby, British Columbia (CA)

( * ) Notice: Subject to any disclaimer, the term of this patent is extended or adjusted under 35 U.S.C. 154(b) by 105 days.

(21) Appl. No.: 10/950,483

(22) Filed: Sep. 28, 2004

(65) Prior Publication Data

US 2006/0067603 A1 Mar. 30, 2006

(51) Int. Cl.
*G02B 6/00* (2006.01)
(52) U.S. Cl. ............... 385/11; 385/1; 385/2; 385/3; 359/483
(58) Field of Classification Search .......... 385/1–3, 385/11; 359/483
See application file for complete search history.

(56) References Cited

U.S. PATENT DOCUMENTS 4,630,889 A * 12/1986 Hicks, Jr. ............... 385/123
5,587,827 A * 12/1996 Hakimi et al. ........... 359/249
6,850,670 B2 * 2/2005 Parhami et al. ........... 385/37

FOREIGN PATENT DOCUMENTS

JP 06085379 A * 3/1994

OTHER PUBLICATIONS

Lang et al., "New Passive Polarization Converter On Glass Substrate", *IEEE*, 1998, pp. 1295-1297.
Rahman et al., "Design and Characterization of Compact Single-Section Passive Polarization Rotator", *Journal of Lightwave Technology*, IEEE, vol. 19, No. 4, 2001, pp. 512-519.
Mertens et al., "Strong Polarization Conversation in Periodically Loaded Strip Waveguides", *IEEE Photonics Technology Letters*, vol. 10, No. 8, 1998, pp. 1133-1135.
Shani et al., "Polarization rotation in asymmetric periodic loaded rib waveguides", *Appl. Phys. Lett.* 59, 1991, pp. 1278-1280.
Koster et al., "Passive Polarization Converter in SiON Technology", *Journal of Lightwave Technology*, vol. 19, No. 6, 2001, pp. 876-883.
O.A. Burke et al., "Efficient Polarization Conversion In Silicon-On-Insulator Waveguides", Optical Society of America, 2002.

* cited by examiner

*Primary Examiner*—Jennifer Doan
(74) *Attorney, Agent, or Firm*—Jeffrey M. Measures; Borden Ladner Gervais LLP

(57) ABSTRACT

A waveguide for use in polarization mode converters and polarization modulators using extrinsic strain to prerotate the principal axes and control birefringence is disclosed herein. The invention relates to the orienting of principal propagation axes in an optical waveguide by pre-stressing the waveguide, using an extrinsic stress, to re-orient the principal propagation axes from an unstressed orientation to a substantially ideal orientation. The waveguide is preferably stressed by an extrinsic strain inducer which applies a shear force to the waveguide to induce anisometry in the waveguide structure.

23 Claims, 6 Drawing Sheets

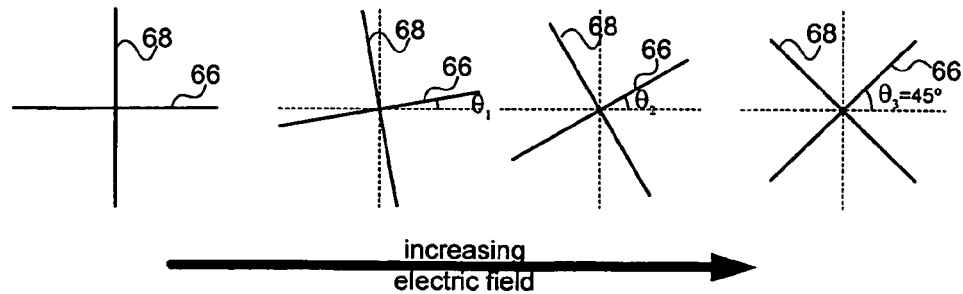
Figure 4 (prior art)
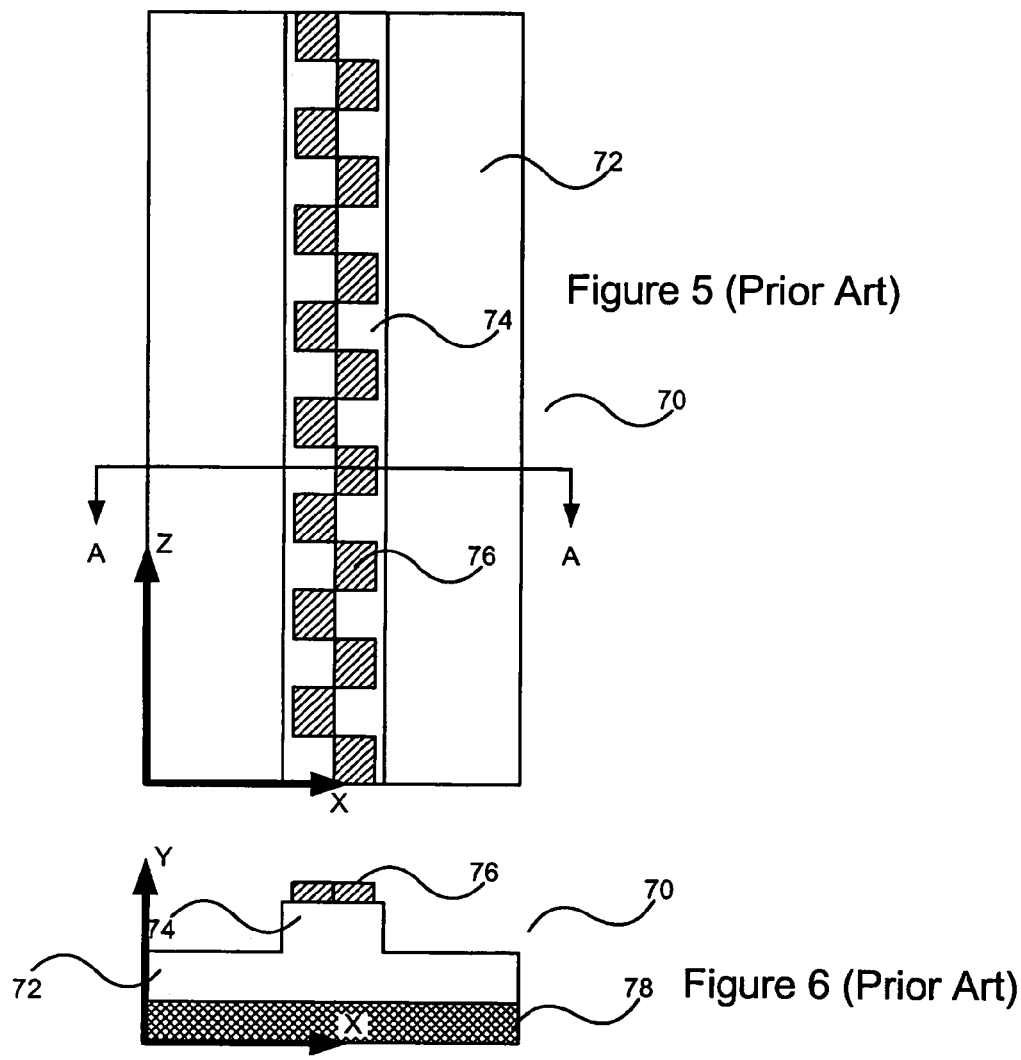
Figure 5 (Prior Art)
Figure 6 (Prior Art)

PASSIVE METHOD AND APPARATUS FOR INDUCING MODE CONVERSION

FIELD OF THE INVENTION

The present invention relates generally to mode conversion inducing optical waveguides. More particularly, the present invention relates to waveguides intentionally stressed to assist in inducing mode conversion.

BACKGROUND OF THE INVENTION

In the fields of integrated optical devices and electro-optical devices, polarization mode converters are known. These converters receive light polarized in a first mode and provide light at an output in a second polarization mode.

Mode converters can be either active or passive. An example of an active mode converter is U.S. Pat. No. 5,566,257 to Jaeger et al, which is incorporated herein by reference. The device of the '257 patent makes use of the electro-optical effect to induce polarization mode conversion.

FIG. 1 illustrates a conventional semiconductor optical waveguide 50 using a compound semiconductor 52, such as gallium arsenide (GaAs). The semiconductor layer 52 has an optical ridge 54 through which the majority of the optical power is transmitted. Semiconductor layer 52 preferably sits atop a substrate 56. In ridge 54 there are two principal axes that provide transmission along axes similar to electric and magnetic field lines. These axes are parallel to the dominant electric field components of the TE-like and TM-like modes. These axes will be referred to here simply as TE and TM. The TE and TM axes can be aligned to geometric X and Y axes. Light transmitted into the waveguide can be thought of as being broken into constituent elements and transferred along the waveguide. At the output of the waveguide, the light from each of the principal axes is combined to form the output light.

Due to the anisotropic nature of many waveguides, transmission of the fundamental waveguide modes, polarized along the principal axes, may not occur at the same speed, due to a phenomenon known as modal birefringence, where each of the principal axes has a different effective index of refraction. The term principal axes of a waveguide, or principle waveguide axes, is used to describe the two directions that are parallel to the dominant electric field components of the two lowest order hybrid modes of the waveguide. The orientation of the principal waveguide axes is dependent on the waveguide's geometry and the principal optical axes of the material forming the waveguide.

FIG. 2 illustrates the waveguide 50 of FIG. 1, with a pair of electrodes 58a and 58b surrounding the ridge 54. When an electric field 60 is applied between electrodes 58a and 58b, the principal axes, U and V, rotate. Additionally, the electric field has an effect on the birefringence of the optical paths. The birefringence, as described above, is a measure of the differing speeds of light transmitted through the crystal structure of the waveguide. When the two axes have been rotated by 45° from the TE and TM aligned axes, the geometry and birefringence allow for "full mode conversion" to result.

FIG. 3a illustrates the rotated axes and an incident input light that is TM aligned. The TM aligned light 62 is resolved into two components, 62u and 62v, equal in magnitude, each of the two components 62u and 62v aligned to one of the principal axes. If birefringence was held to zero the incident light 62 would be resolved into equal U and V components, 62u and 62v, propagated along the length of the waveguide and at the output the components would recombine to provide an output that was TM aligned. However, if the propagation speed along the axes is different, the two resulting outputs will be out of phase with each other. If the phase difference is a multiple of 360°, the outputs will be out of phase but phase aligned, however if the U and V components are 180° out of phase, or an odd numbered multiple of 180°, the output, as shown in FIG. 3b, will be a combination of the u component and the negative of the v component, 62u' and 62v'. The combination of these outputs results in an output light that is TE aligned. Thus, the combination of geometry and birefringence results in a phase shift that simulates mode conversion.

FIG. 4 illustrates the effect of an electrical field oriented in a <011> direction on the geometry of the principal axes of a <01$\bar{1}$> directed waveguide, fabricated on a (100) cut electro-optic crystal with $\bar{4}$3 m symmetry. As the field is increased from zero, the axes 66 and 68 rotate from a TE and TM alignment by an angle of θ. As the field increases, θ approaches 45°. A similar effect occurs with the birefringence, in that the birefringence increases with the strength of the electric field across the ridge 54, resulting in a greater disparity in the velocities. One skilled in the art will appreciate that the existence of principal axes implies the existence of some initial modal birefringence in the TE and TM axes to force θ=0 at zero electric field.

FIGS. 5 and 6 illustrate a passive mode converter 70 known in the art, that relies upon a structural feature to provide the necessary rotation of the principal axes. FIG. 5 is a top view of the converter 70, which is fabricated from a crystal 72, typically a compound semiconductor, which has a central ridge 74. FIG. 6 illustrates a cross-sectional view along cut line A-A. The converter 70 is shown with crystal 72, having ridge 74, mounted on substrate 78. Atop ridge 74 are a series of periodic layers of crystal 76. A mode converter of this sort is described in "Polarization rotation in asymmetric period loaded rib waveguides" published in Appl. Phys. Lett 59(11), 9 Sep. 1991. The periodic layers 76 form a staggered pattern, alternating about a centre line in the waveguide ridge 74. The presence of these layers causes a slight perturbation in the alignment of the principal axes under the layer 76. Over the length of the mode converter 70 these perturbations combine to provide full mode conversion even though the principal axes are not in their ideal 45° orientation. The perturbation in the principal axes is caused by the loading of ridge 74 by layers 76. Birefringence is also enhanced by the selection of a different compound semiconductor for layer 76. On one described embodiment, the waveguide 72 is formed from InP, while the layers 76 are formed from a "1.3Q" crystal composition. The combination of the materials is specifically chosen to mitigate, and preferably to eliminate, any shear stress caused by a size differential in the crystal matrices. The perturbations allow for mode conversion in a limited bandwidth of light. The periodicity and pattern applied in periodic layer 76 are designed to specifically interact with selected wavelengths, and as a result the overall mode converter 70 does not operate over a wide bandwidth.

FIG. 7 illustrates further passive structures known to have rotated principal axes. FIG. 7 illustrates a mode converter 80 made of a crystal 82 and having a waveguide ridge 84 that has an outwardly sloping slide. The non-square structure of the waveguide ridge 84 results in polarization modes that are not perfectly aligned with the TE and TM axes. Though the orientation of these axes depends on the exact shape of the waveguide ridge 84, proper design of the waveguide ridge 84 can result in rotated principal axes. This allows for a mode converter to be designed using geometric asymmetry in the waveguide ridge 84, which permits the waveguide axes to deviate from the normal axes of the substrate.

Though the system illustrated in FIG. 2 does effectively modulate the polarization mode in phase with an electric signal (generating an electric field across electrodes 58a and 58b), the field strength must be sufficient to rotate the principal axes to near 45°. When acting as a simple mode converter, this system has the drawback of requiring excessive DC voltage, whereas other converters can be passive, and thus less prone to electrical failure and performance drift. The modulation in the prior art is obtained by applying a large DC bias voltage to get the axes orientation to near 45°, then a smaller AC voltage is used to switch between on-off states. In the course of getting the axes to near 45°, the modulator passes through multiple on-off states with progressively better mode conversion efficiency. The DC voltage used to bias the modulator can vary over time as the properties and characteristics of the modulator change due to temperature, stress and fatigue. As a result the modulator requires periodic recalibration, which typically requires that the modulator be taken off-line.

Systems such as those illustrated in FIGS. 5, 6 and 7, though offering passive mode conversion, do not provide polarization modulation, and require sophisticated manufacturing techniques to achieve a specific, repetitive pattern that induces sufficient birefringence and axes rotation. The mode converter of FIGS. 5 and 6 requires the deposition of a 1.3Q layer on the waveguide, and then an etching process to selectively remove portions of the 1.3Q layer to leave the required pattern. Other mode converters employ internal repetitive structures to effect a rotation of the principal axes, and as a result are equally difficult, if not more difficult, to produce. As noted above, passive mode converters of this design function only over a narrow optical bandwidth, and are inefficient when used in electro-optic modulation. The inefficiency arises from the fact that in each waveguide section, the principal axes are not aligned closely to 45° and as a result the electro-optic effect is not acting fully in the same direction as the principal axes. The mode converter of FIG. 7 provides some degree of axes rotation, and has a static birefringence that is useful for passive mode conversion, but does not provide a mechanism to modulate the polarization.

It is, therefore, desirable to provide an optical waveguide suitable for use as both a passive mode converter and an active polarization modulator.

SUMMARY OF THE INVENTION

It is an object of the present invention to obviate or mitigate at least one disadvantage of previous mode converters and polarization modulators.

A first aspect of the present invention provides a method for orienting principal propagation axes in an optical waveguide. The method comprises pre-stressing the waveguide, using an extrinsic stress, to re-orient the principal propagation axes from an unstressed orientation to a substantially ideal orientation. In various embodiments of the first aspect of the present invention, the step of pre-stressing includes applying asymmetric stress to the waveguide, where the stress layers can be adjacent to the waveguide, and optionally applied to a surface of the waveguide. The step of pre-stressing can also include the step of applying a second stress layer adjacent to an opposing surface of the waveguide.

In a second aspect of the present invention, there is provided an optical component device comprised of a waveguide and an extrinsic stress inducer. The waveguide is formed from an optical guiding layer and has a pair of principal propagation axes. The extrinsic stress inducer is for establishing stress in the waveguide to control the birefringence of the principal propagation axes and to rotate the principal propagation axes to a substantially ideal orientation. In one aspect of the present invention, the waveguide is a ridge waveguide and the optical guiding layer is a compound semiconductor optical guiding layer, which is optionally selected from a list including gallium arsenide and aluminum gallium arsenide. In another embodiment, the optical guiding layer is lithium niobate. In further embodiments, the waveguide is integrally formed from the optical guiding layer and the stress inducer is a stress inducing layer that optionally abuts at least one of the the optical guiding layer and the waveguide. In one embodiment, the stress inducing layer is a layer of silicon nitride. In further embodiments, the device further includes a second stress inducer for applying an second extrinsic strain on the waveguide to control the birefringence of the principal axes and to rotate the principal axes to a substantially ideal orientation in conjunction with the extrinsic strain applied by the stress inducer. In a further embodiment, the optical component device includes first and second electrodes, the first electrode disposed to one side of the waveguide, the second electrode disposed to the opposing side of the waveguide, the first and second electrodes for generating an electric field to induce the electro-optic effect in the waveguide to achieve polarization modulation in the waveguide.

In a third aspect of the present invention, there is provided a compound semiconductor optical mode converter. The mode converter comprises a waveguide and a stress inducer. The waveguide is formed on a compound semiconductor substrate. The stress inducer applies an extrinsic stress to the waveguide to re-orient principal propagation axes of the waveguide from a first orientation to a substantially ideal orientation. In embodiments of the third aspect of the present invention, the stress inducer includes a first layer abutting an edge of the waveguide. In another embodiment the stress inducer includes a first stress layer which applies a first force to one edge of the waveguide and a second stress layer which applies a second force to an opposite edge of the waveguide. In embodiments of the present invention, the mode converter is either a gallium arsenide based mode converter or an indium phosphide based mode converter. The stress inducer, or layers, are preferably layers of silicon nitride.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 4 is a representation of the effect of an electric field on the principal axes;

FIG. 5 is a top view of a mode converter of the prior art;

FIG. 6 is a front view of the mode converter illustrated in FIG. 5;

DETAILED DESCRIPTION

Figure 1:
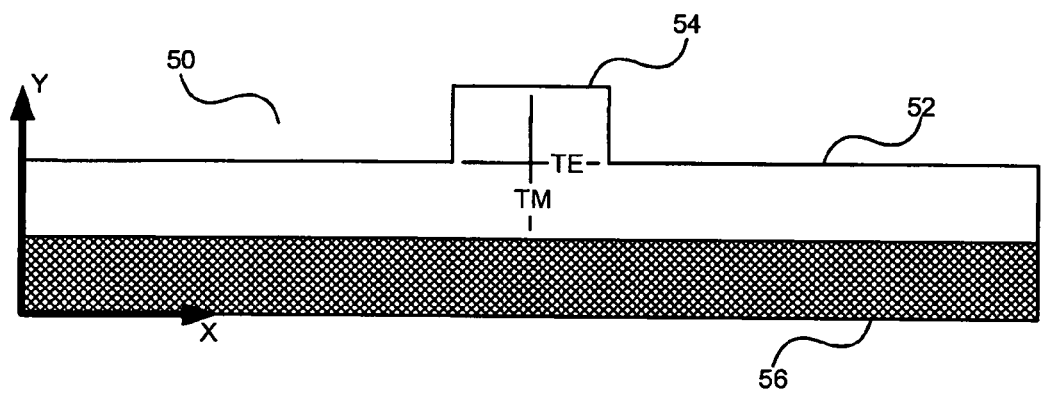
FIG. 1 is a block diagram representation of a prior art semiconductor waveguide.
Figure 2:
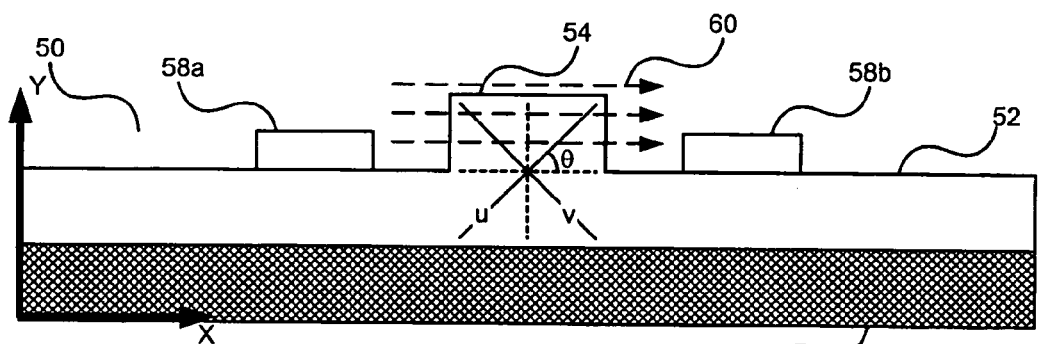
FIG. 2 is a block diagram representation of a prior art semiconductor waveguide with the electro-optic effect.
Figure 3A:
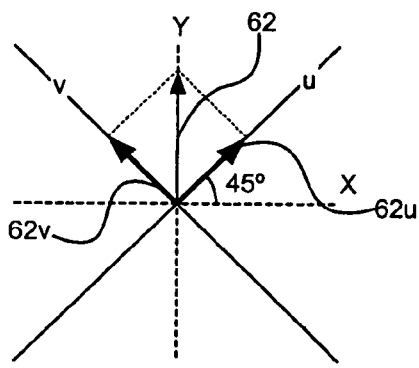
FIGS. 3a and 3b are vector illustrations of polarization modulation through phase shifting.
Figure 3B:
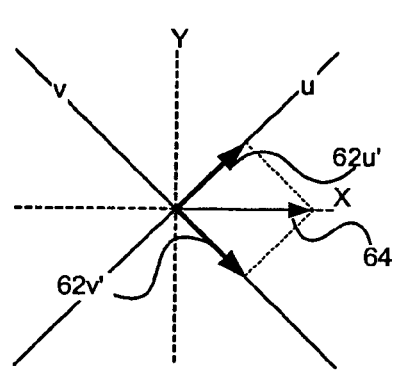
Figure 7:
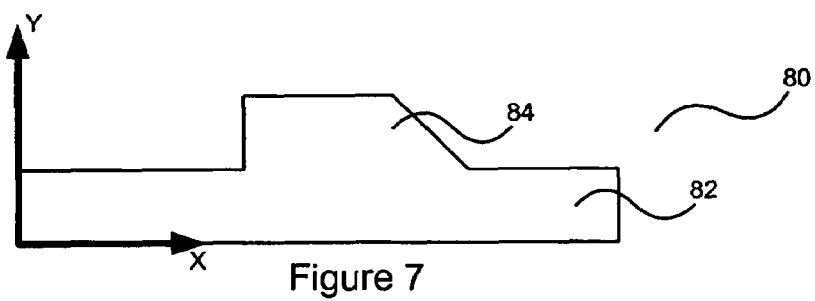
FIG. 7 is a block diagram representation of a prior art semiconductor waveguide geometry.

In the prior art, modulators using the electro-optic effect and polarization mode converters using inherent birefringence and passive axis rotation are taught. The use of the electro-optical effect on the prior art passive mode converters is not always feasible due to the lack of electro-optic materials in their use. Furthermore, the partial rotation of the waveguide axes in the periodic mode converters does not provide efficient electro-optic modulation.

In an ideal active mode converter, the principal axes are oriented at 45° from the TE and the TM axes and the birefringence in the principal axes is modulated by varying the electric field. This can be accomplished in three ways. The first is by having zero birefringence at zero electric field. In this configuration, the axes are undefined in the absence of birefringence and the polarization state of light entering the waveguide will be the same as light exiting the waveguide. When an electric field is applied, the degeneracy is broken and axes are created with a 45 degree orientation as a result of the electro-optic effect. Because it is difficult in practice to achieve zero birefringence with practical fabrication tools, this scenario is difficult to realize. The second method to obtain ideal active mode converter behaviour is to apply a large static (DC) electric field to the waveguide such that the electro-optic effect overcomes any birefringence that would otherwise hold the axes near the 0 degree orientation. The third method of achieving the ideal active mode converter behaviour is to pre-align the optical axes at 45° by some means while having no electric field. In this case, the U and V axes will have different speeds and the light exiting the waveguide will have a polarization state dependent on the birefringence, the waveguide length, and the input launch conditions. The present invention is directed towards mode converters and polarization modulators using the third method which is advantageous because it allow for a reduction in the required strength of the electric field in comparison to prior art implementations because no static field is required to rotate the axes.

One skilled in the art will readily appreciate that a modulator designed to provide near ideally rotated principal axes with the application of a very small electric field, can be used as a passive mode converter if instead of controlling the birefringence to zero, the birefringence is controlled to another value to allow for passive mode conversion.

In the prior art, the use of additional surface layers or dopants in selected regions is carefully utilized, in an attempt to not disrupt the crystal matrix of the waveguide. When additional layers are placed on the waveguide ridge, the layer material is conventionally selected to have a matching crystal lattice size so that there is no strain on the waveguide. Slight strains on the waveguide induce the strain-optic effect which has previously been used to cause minor perturbations in the principal axes.

The present invention makes use of the strain-optic effect to rotate the principal axes to a desired orientation and to control the birefringence to a desired value.

Though prior art implementations have been concerned with inducing a series of slight perturbations in the principal axes, the present invention applies a large stress to the waveguide, preferably a large extrinsic stress, to rotate the axes and control birefringence to a desired orientation and value.

Figure 8:
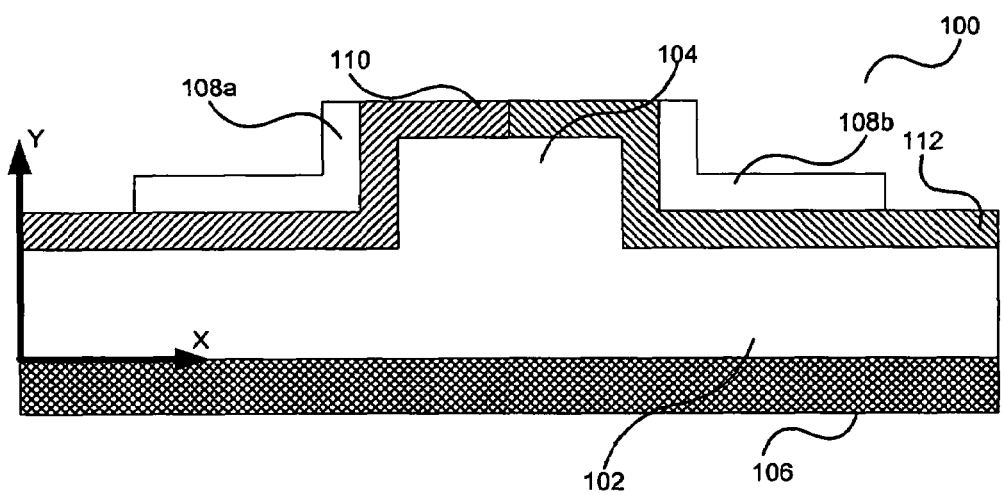
FIG. 8 is a block diagram illustration of the cross section of a waveguide of the present invention.

FIG. 8 illustrates an embodiment of the present invention. Polarization modulator 100 has an optical guiding layer 102 formed from a semiconductor crystal, having a waveguide ridge 104 to allow for modulation using the electro-optic effect. A pair of stress layers 110 and 112 sit atop optical guiding layer 102 and waveguide ridge 104. Stress layer 110 applies a shearing force to the surface of the waveguide, while stress layer 112 applies another shearing force. The use of dual layers is presently preferred to allow for control of total and differential stress, though a single layer can be implemented to achieve the same result depending upon the nature of optical guiding layer 102. One skilled in the art will appreciate that in many cases the forces applied by stress layers 110 and 112 are asymmetric, as a result layers 110 and 112 are also referred to as asymmetric stress layers.

The strain-optic effect is known to be capable of causing both axis rotation and birefringence due to a stress induced change in the anisometric nature of the waveguide crystal. A large shear force applied to the region of waveguide ridge 104 can change the crystal structure sufficiently to achieve the desired orientation and birefringence. It has been found that birefringence and axes orientation can be controlled separately, by the control of the total, or average, stress applied to the transmission region of optical guiding layer 102, in the case of FIG. 8 the transmission region being the waveguide ridge 104, determining the birefringence. The orientation of the axes is then controlled by the stress differential applied by the two stress layers 110 and 112

The degree of shear stress is a function of the difference in the stresses of layers 110 and 112, called the differential stress. For example, if layer 110 has −200 MPa (MegaPascals) and layer 112 has +200 MPa, the differential stress will be 400 MPa. In practice, it is advantageous to use an average stress as well. The average stress is used to minimize the birefringence coincident with the substrate axes (i.e. θ=0). This reduces the amount of differential stress that is required to approach near ideal mode converter behaviour. For example, if a −200 MPa average stress was required to achieve nominally zero birefringence (in the absence of the shear stress), the stress values in the present example would be −400 MPa and 0 MPa.

The electrodes 108a and 108b provide a means to apply an electric field to the waveguide ridge 104 for electro-optic modulation. The layers 110 and 112 in this configuration additionally serve the function of an optical buffer layer, and limit the interaction of the optical mode with the electrodes 108a and 108b to reduce optical absorption otherwise caused by the electrodes 108a and 108b. The average stress of layers 110 and 112 can be adjusted in instances where the electrodes 108a and 108b have significant non-zero stress.

Figure 9A:
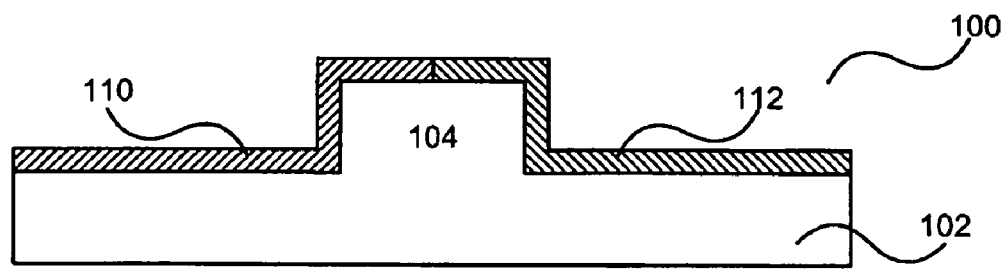
FIGS. 9a 9b, 9c and 9d are exaggerated block diagrams illustrating the strain effect on the edges of a waveguide ridge in the present invention.
Figure 9B:
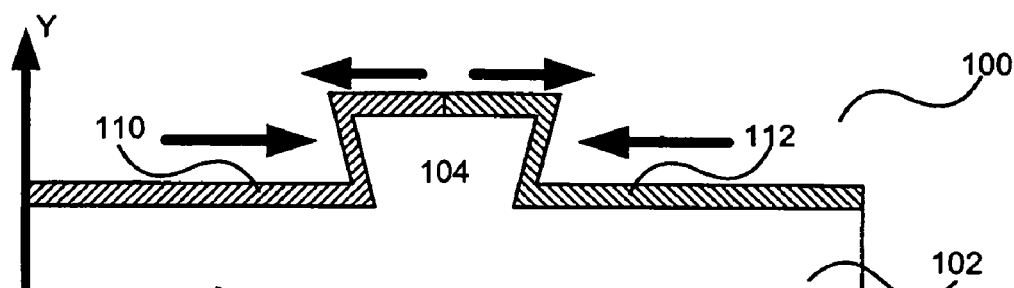
Figure 9C:
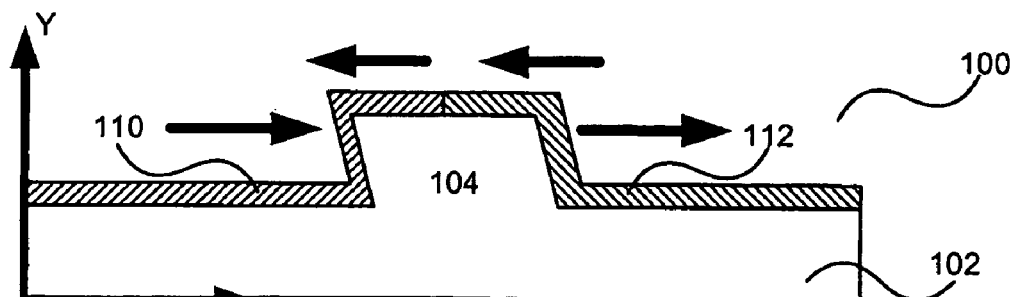
Figure 9D:
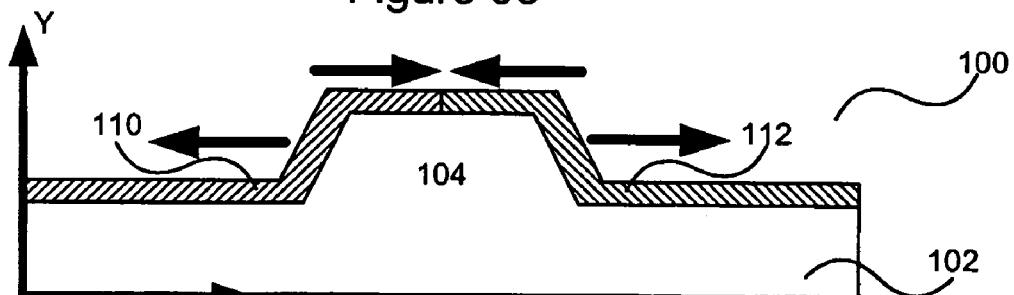

The effect of the stress is to distort the structure of the crystal so that the desired properties are achieved. One skilled in the art will appreciate that the application of strain on optical guiding layer 102 results in minor distortions of waveguide ridge 104. FIGS. 9a-9d illustrate exaggerated distortions of waveguide ridge 104. FIG. 9a illustrates modulator 100 having the semiconductor crystal optical guiding layer 102 and waveguide ridge 104 with stress inducing layers 110 and 112. Other elements of modulator 100 have been omitted for the purpose of clarity. Because layers 110 and 112 are independent of each other, the stresses that they apply can differ in both magnitude and direction. In FIG. 9b, the stresses in layers 110 and 112 are both compressive resulting in a compression at the base of waveguide ridge 104 and a tension at the top of waveguide ridge 104. Because the top edges of waveguide ridge 104 are isolated from the base of optical guiding layer 102, they are more susceptible to being distorted, and as illustrated in an exaggerated sense, they are pulled outward from their base to form an inverted trapezoidal waveguide ridge 104. FIG. 9c illustrates the resulting parallelogram-type shape of waveguide ridge 104 when stress layers 110 and 112 apply a shearing force in the same direction as a result of having a differential stress. In this case, stress layer 110 is compressive while stress layer 112 is tensile. One skilled in the art will realize that waveguide ridge 104 would not form a true-parallelogram under all differential stress conditions, and under other conditions the shape is only describable as a quadrilateral. Similar differentiation can be made for the other described shapes of waveguide ridge 104. FIG. 9d illustrates the distortions in waveguide ridge 104 as a result of stress layers 110 and 112 both having tensile stress. This results in a trapezoidal shape.

The induced anisometry of the optical guiding layer 102 in the region of waveguide ridge 104, allows for the rotation of the principal axes to the desired position while birefringence is controlled to a desired level.

The stress applied by layers 110 and 112 can be quantified by the average and differential stresses. Each of the average and differential stresses is independently adjustable by selection of the stresses applied by each of layers 110 and 112. The stresses are controlled to achieve different results. Determining the average stress will be discussed first. The average stress is adjusted to obtain the desired birefringence which, in the case of a mode converter modulator, is preferably near zero modal birefringence in the principal axes when the differential stress is set to zero. The optimum value of the average stress does not depend on the differential stress and so it is convenient to determine the average stress in models in which the differential stress is zero.

There are two components to the modal birefringence: geometric birefringence and material birefringence. Zero modal birefringence can be achieved by either having both geometric and material birefringence equal to zero, or by having these two components being equal and opposite in sign so that their sum is still zero. Either one of the two methods of obtaining zero modal birefringence can be used. When designing the system 100, there are often other requirements of the structure in addition to obtaining a particular birefringence. For instance, waveguide cross-sections for electro-optic modulators are often designed to maximize the overlap of the modulating electric field with the optical field so that the modulator's drive voltage is minimized. If the zero geometric birefringence condition conflicts with other constraints on the structure, the material birefringence can be used to cancel the geometric birefringence.

The material birefringence in an unstrained, optically isotropic material is zero. GaAs as well as $Al_xGa_{1-x}As$, both of which are compound semiconductors, are not birefringent in their unstrained states. Growing $Al_xGa_{1-x}As$ layers on top of a GaAs wafer will however produce a material birefringence in the $Al_xGa_{1-x}As$ layers because the lattice constants of $Al_xGa_{1-x}As$ and GaAs differ with increasing Al concentration. This difference in the lattice constants results in a lattice mismatch which result in a stress induced birefringence in the waveguide. An $Al_xGa_{1-x}As$ core waveguide on a GaAs substrate will thus have a material birefringence that is non-zero. This birefringence is preferably considered in combination with the material birefringence of stress layers 110 and 112 to cancel geometric birefringence.

The material birefringence at any point in the waveguide structure can be calculated if the strain is known. Strain can be calculated using known techniques, commonly implemented in commercial software. The equation relating the impermeability change (reciprocal of refractive index squared) to the strain is given by the equation:

$$\Delta\left(\frac{1}{n^2}\right)_{ij} = \sum_{k,l=1}^{3} P_{ijkl}\varepsilon_{kl}$$

where $P_{ijkl}$ is the strain-optic tensor for the waveguide material, and $\varepsilon_{kl}$ is the strain tensor. The strain-optic tensor is assumed here to be transformed from the crystallographic coordinates into the coordinate system of the waveguide axes. The material birefringence in the absence of shear strains will be simply $n_{11}-n_{22}$. Here 1, 2, 3 subscripts are equivalent to the x,y,z directions in the waveguide coordinates. In general, the birefringence will be a function of position in the cross-section of the waveguide structure. The contribution of the material birefringence to the modal birefringence is given by the overlap of the optical mode field with the material birefringence. This can be calculated by weighting the relative permittivity tensor K (inverse of the impermeability tensor) by the optical power distribution of the relevant mode. For example the change in effective relative permittivity "seen" by the TE-like mode will be given by:

$$\Delta K_{11}^{eff} = \frac{\int\int \Delta K_{11}(x,y) I^{TE}(x,y) dx dy}{\int\int I^{TE}(x,y) dx dy}$$

where $\Delta K_{11}(x,y)$ is the change in relative permittivity caused by the strain, and $I^{TE}(x,y)$ is the optical intensity distribution for the TE-like mode. The change in effective index for the TE-like mode is then given by:

$$\Delta n_{11}^{eff} = \frac{\Delta K_{11}^{eff}}{2n_{11}}.$$

The calculation is similar for the TM-like mode. The stress induced modal birefringence is given by:

$$B^{str} = \Delta n_{11}^{eff} - \Delta n_{22}^{eff}$$

This procedure applies for any mechanism that induces strain in the waveguide, including the use of stressed layers on opposite sides of the waveguide. The relationship between the stress in the stressed layers and the modal birefringence is determined by computer modeling of the stress or strain in the waveguide structure. The birefringence is first calculated with the stress of the stressed layers set to zero, and then again with the stress of the stressed layers set to some nominal value, for example 100 MPa. The coefficient relating stress in the stressed layers for a particular structure is then given by:

$$\gamma = \frac{B^{str}(100 \text{ MPa}) - B^{str}(0 \text{ MPa})}{100} (\text{MPa}^{-1}).$$

The required average stress in the stressed layers required to achieve any particular strain induced birefringence can then be calculated by:

$$\sigma^{ave} = \frac{B^{str}}{\gamma}$$

It should be noted that $\gamma$ must be non-zero, that is the stressed layers must be located such that they can induce a net average strain in the waveguide core.

The procedure for determining the desired differential stress in the stressed layers follows a similar procedure to the calculation of average stress. The purpose of the differential stress is to induce fast and slow axes at 45° to the TE-like and TM-like aligned axes (the TE, and TM axes). The degree of velocity difference between fast and slow axes (birefringence) at the 45° orientation will be called $B_{45}^{str}$. The permittivity tensor component that relates to birefringence in this orientation is $\Delta K_{12}(x, y)$. Again, an effective permittivity is calculated according to:

$$\Delta K_{12}^{eff} = \frac{\int\int \Delta K_{12}(x, y) I^{TE}(x, y) dx dy}{\int\int I^{TE}(x, y) dx dy}.$$

Since the optical mode profiles for the fundamental TE-like and TM-like modes are very similar, we can use the TE-like mode intensity profile in this calculation instead of the actual hybrid mode profile of the differentially stressed waveguide. The birefringence in the 45° orientation is given by:

$$B_{45}^{str} = \frac{\Delta K_{12}^{eff}}{n_{11}}.$$

The required magnitude for $B_{45}^{str}$ depends on the application. A larger value means the optical axes of the waveguide will be less sensitive to non-zero values of the normal birefringence $B^{str}$. A larger $B_{45}^{str}$ will therefore produce a structure that is less sensitive to fabrication tolerances, less sensitive to stress associated with physically mounting the waveguide into a package, and less sensitive to stress caused by temperature changes of the waveguide structure or other perturbations. The practical limits on the value of $B_{45}^{str}$ will be governed by the range of stress available from the tools that deposit the stressed layers, and the adhesion of those layers. The adhesion limits can be determined experimentally for any particular fabrication process. A typical value of $B_{45}^{str}$ will be on the order of 1E-4 with a differential force per unit length (integral of the differential stress over the film thickness) on the order of 100 N/m.

The thickness of the stress applying layers is preferably chosen such that a sufficient force can by applied to the waveguide core. This force will be proportional to the integral of the film stress over the thickness of the layer. Thus if the stress of a particular film is limited over some range, the film thickness can be further increased to increase the force, within the limits of the film's adhesion. In the case where the stressed layers also provide the function of an optical buffer layer, it may be desirable to control the force by adjusting the stress rather than the film thickness since a particular film thickness may be required for correct functioning of the optical buffer. Excessive optical buffer layer thickness will reduce the electric field strength in the waveguide, resulting in larger switching and bias voltages.

The presently preferred material for the stress layers is silicon nitride. This material can be deposited with controllable stress using Plasma-Enhanced Chemical Vapor Deposition (PECVD) reactors. PECVD reactors that use dual frequencies facilitate the adjustment of stress. Other deposition methods may also be used. Materials other than silicon nitride may also be used including other dielectrics, semiconducting materials, and metals. For example, stress can be controlled in most films by adjusting the deposition temperature and exploiting differing thermal expansion coefficients between the film and the substrate. For embodiments that use the stress layer as an optical buffer layer, the selected material is preferably optically transparent. Silicon nitride is transparent in the 1550 nm optical telecommunications band.

As noted above, the location of stress inducers such as stress inducing layers 110 and 112 is not crucial, so long as an appropriate strain is applied to the core of the waveguide to effect both the alignment of the principal axes and the birefringence. In the ideal, the birefringence from the term $B^{str} = \Delta n_{11}^{eff} - \Delta n_{22}^{eff}$ is preferably near zero, but the birefringence in the 45 degree orientation (the u and v axes) from $$B_{45}^{str} = \frac{\Delta K_{12}^{eff}}{n_{11}}$$

is non-zero. For a passive mode converter, $B_{45}^{str}$ can be selected to achieve any desired degree of mode conversion for a particular wavelength and waveguide length. Full conversion is achieved when the components of the light transmitted along the principal axes reach the output 180° out of phase.

Figure 10:
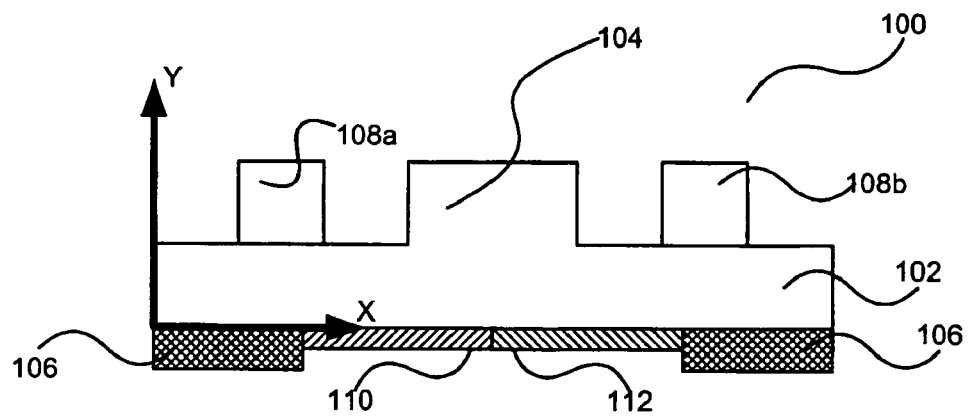
FIG. 10 is an illustration of an embodiment of the present invention.

FIG. 10 illustrates an embodiment of the present invention, where the stress inducing layers are located below optical guiding layer 102. Modulator 100 includes optical guiding layer 102 having waveguide ridge 104, substrate 106 and electrodes 108a and 108b. In this embodiment, substrate 106 has been removed from portions of the base of optical guiding layer 102 so that stress inducers, in this case stress inducing layers 110 and 112, can be applied. One skilled in the art will appreciate that layers 110 and 112 need not overlap with the region of waveguide ridge 104, and could be located closer to the edges of optical guiding layer 102, so long as the shear stress that they apply is suitably increased to provide sufficient strain on the region of waveguide ridge 104 to induce the desired rotation of the principal axes and to sufficiently control the birefringence.

Figure 11:
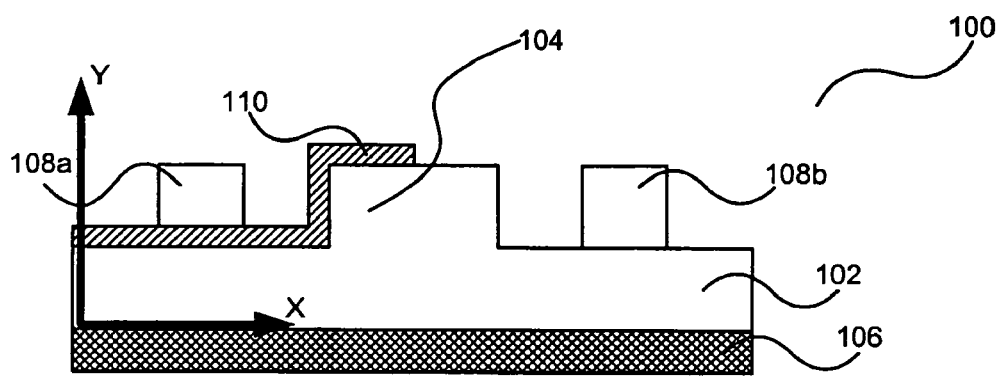
FIG. 11 is an illustration of an embodiment of the present invention.

As noted in the above discussion of the application of stress layers 110 and 112, the rotation of the principal axes and the control of birefringence are achieved through the average strain and the differential strain on waveguide ridge 104. Depending on the average and differential values required, the average and differential strains can be achieved by the application of a single stress inducing layer. FIG. 11 illustrates such an embodiment. Modulator 100 includes optical guiding layer 102 with waveguide ridge 104 sitting atop substrate 106 and having electrodes 108a and 108b. Stress layer 110 applies force to one side of waveguide ridge 104 and optical guiding layer 102 to achieve both the average strain on waveguide ridge 104 and the differential strain to rotate the axes to the desired location of 45°, and to achieve the desired birefringence. By removing the electrodes 108a and 108b, the modulator 100 can be used as passive mode converter. If full conversion is desired, the birefringence is controlled so that at the output the light from the principal axes is 180° out of phase.

Figure 12:
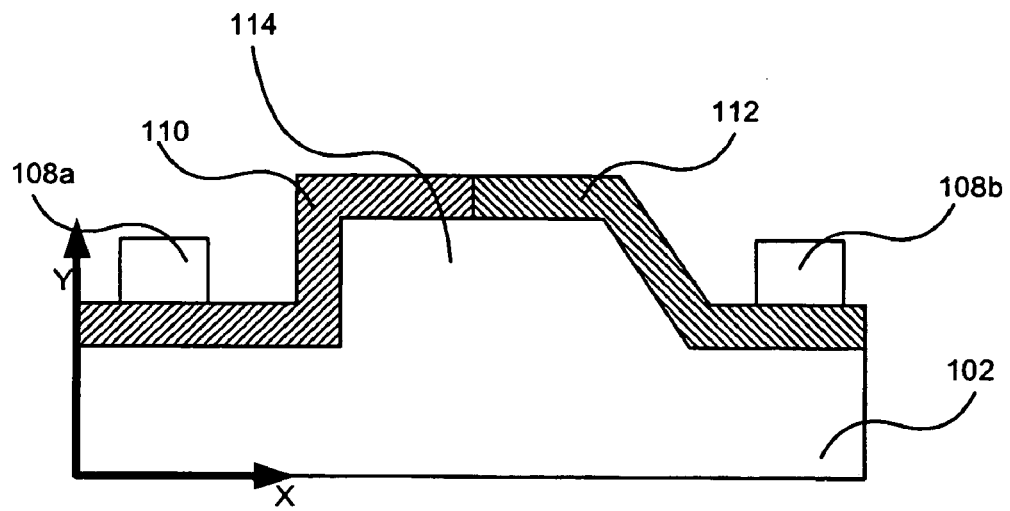
FIG. 12 is an illustration of an embodiment of the present invention having an asymmetric waveguide ridge.

FIG. 12 illustrates the application of stress layers 110 and 112 to ridge 114 which is geometrically asymmetrical. The use of the stress layers 110 and 112 on ridge 114 and substrate 102 allow for correct orientation of the principal axes and control of birefringence. As discussed above an electric field between electrodes 108a and 108b allow modulation of the polarization in phase with an external electrical signal.

Figure 13:
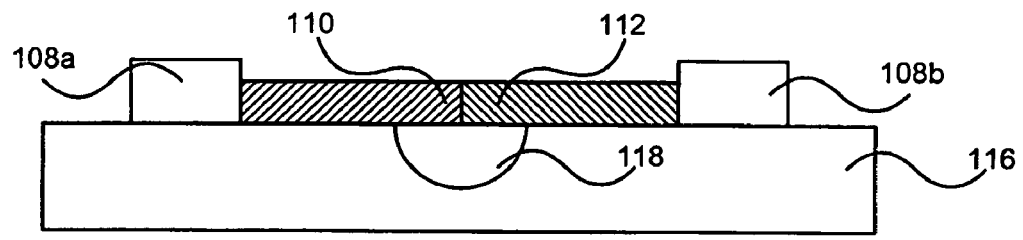
FIG. 13 is an illustration of an embodiment of the present invention in a ridgeless waveguide.

FIG. 13 illustrates an embodiment of the present invention, not making use of compound semiconductor waveguides. Optically transparent materials with a non-zero strain-optic effect may be used such as silicon, lithium niobate, or glass. Optical guiding layer 116 has waveguide 118 that has a higher index of refraction than guiding layer 116 to confine optical power in the waveguide 118. As with compound semiconductor optical waveguides, in the waveguide 118, there are principal axes, each of which has an independent transmission speed. The application of stress inducing layers 110 and 112 provide sufficient average and differential strain on waveguide 118 to pre-rotate the axes and control birefringence. In the case where modulation is desired, the waveguide material preferably has a non-zero electro-optic coefficient which acts in the direction of the principal waveguide axes. The use of electrodes 108a and 108b is similar to their use in previous embodiments. The electro-optic effect is applied when a field is generated between electrodes 108a and 108b, and the birefringence of waveguide 118 is modulated to allow for polarization modulation. Electrodes 108a and 108b may be alternatively located on top of layers 110 and 112 respectively. In general, the orientation of the electric field will be specific the electro-optic material that is used. For example, the horizontally directed electric field established by electrodes 108a and 108b is appropriate for optical guiding layer 116 being constructed from lithium niobate with a crystallographic orientation such that the electric field is in the X-crystallographic direction, and the optical propagation is in the Z-crystallographic direction.

One skilled in the art will appreciate that though illustrated above as layers of silicon nitride, the stress inducers need not be applied layers, nor do they need to be silicon nitride. Other compounds applied as layers that have similar stresses, on the order of tens to thousands of megapascals, can achieve the same result. Because the layer thickness can be scaled inversely with the stress, it is possible to have a 5 micron thick layer with 10 MPa giving the same effect as 0.5 microns with 100 MPa. Similarly, other stress inducers can be used. The application of extrinsic stress, with the ability to control both the average and differential stress of the extrinsic stress mechanism used to strain the optical transmission region of a waveguide is sufficient for replicating the system of the present invention.

For electro-optic mode converters, the invention alleviates the manufacturing challenges associated with phase matching the two fundamental modes of the mode converter (TE-like and TM-like modes). In a standard mode converter, phase matching of the two modes is a requirement for efficient exchange of optical power between the two modes. The phase matching condition can be obtained, as is known, by precise control of the waveguide geometry and the birefringence of the materials of the core. In practice, the fabrication tolerances required of the waveguide geometry and material stresses are difficult to achieve, especially for multi-layer structures that include an optical waveguide with optical buffer layers and electrodes near the waveguide. A further problem encountered with achieving the phase matching condition is that material properties are temperature dependent and can limit the operating temperature range of the mode converter. A further problem is that stress induced by packaging a mode converter chip can disrupt the phase matching condition. The application of controlled average and differential strain as described above provides a mechanism to make the mode converter less sensitive to geometric tolerances, material properties, temperature change, and packaging stress. By avoiding the periodic phase matching of the prior art, the present invention functions over a broad optical bandwidth.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for orienting principal polarization axes in an optical waveguide formed on a substrate, the substrate defining a plane, the method comprising:
   pre-stressing the waveguide, using a plurality of extrinsic stresses, to define principal polarization axes with orientations that are neither parallel nor perpendicular to the plane defined by the substrate;
   wherein the pre-stressing includes applying at least one stress layer adjacent to the waveguide.

2. The method of claim 1, wherein the pre-stressing includes applying asymmetric stress to the waveguide.

3. The method of claim 1, wherein the at least one stress layer is applied to a surface of the waveguide.

4. The method of claim 1, wherein the pre-stressing further includes applying a second stress layer adjacent to an opposing surface of the waveguide.

5. The method of claim 4 wherein, a difference in stresses between the at least one stress layer and the second stress layer is selected to cause birefringence in said principal polarization axes, and an average value of stresses in the at least one stress layer and the second stress layer is selected to orient said principal axes at substantially 45 degrees and 135 degrees from the plane of the substrate.

6. The method of claim 1 wherein, the waveguide is an electro-optic waveguide with principal electro-optic axes, the orientations of the principal polarization axes being substantially aligned with the principal electro-optic axes.

7. An optical component device comprising:
a waveguide formed from an optical guiding layer and having a pair of principal polarization axes; and
first and second extrinsic stress inducers for establishing stress in the waveguide to control the birefringence of the principal polarization axes and to rotate the principal polarization axes to a substantially ideal orientation in conjunction with each other;
wherein at least one of the stress inducers is a stress inducing layer inducing stress in the optical guiding layer and the waveguide.

8. The optical component device of claim 7, wherein the waveguide is a ridge waveguide.

9. The optical component device of claim 6, wherein the optical guiding layer is a compound semiconductor optical guiding layer.

10. The optical component device of claim 9, wherein the compound semiconductor includes at least one of: gallium arsenide, aluminium gallium arsenide, and indium phosphide.

11. The optical component device of claim 7, wherein the optical guiding layer is lithium niobate.

12. The optical component device of claim 7, wherein the waveguide is integrally formed from the optical guiding layer.

13. The optical component device of claim 7, wherein the stress inducing layer abuts the waveguide.

14. The optical component device of claim 7, wherein the stress inducing layer is a silicon nitride layer.

15. The optical component device of claim 7 further including first and second electrodes, the first electrode disposed to one side of the waveguide, the second electrode disposed to the opposing side of the waveguide, the first and second electrodes for generating an electric field to induce an electro-optic effect in the waveguide to achieve polarization modulation in the waveguide.

16. A compound semiconductor optical mode converter, comprising:
an electro-optic waveguide formed on a compound semiconductor substrate, the electro-optic waveguide having principal electro-optic axes and principal polarization axes; and
an asymmetric stress structure formed on the waveguide, the asymmetric stress structure to orient the principal polarization axes substantially with the principal electro-optic axes;
wherein, the asymmetric stress structure includes stress layers each applying a stress to the waveguide different from a stress applied by at least one other stress layer.

17. The mode converter of claim 16, wherein the asymmetric stress structure includes a first layer abutting an edge of the waveguide.

18. The mode converter of claim 17, wherein the stress inducer includes a silicon nitride layer.

19. The mode converter of claim 16, wherein the mode converter is a gallium arsenide based mode converter.

20. The mode converter of claim 16, wherein the mode converter is an indium phosphide based mode converter.

21. The mode converter of claim 16 wherein, the asymmetric stress structure includes a first stress layer abutting an edge of the waveguide and a second stress layer abutting an opposite edge of the waveguide.

22. The mode converter of claim 16 wherein, the asymmetric stress structure includes only one stress layer asymmetrically formed on the waveguide.

23. The mode converter of 16 wherein, the electro-optic waveguide has an asymmetrical profile and the asymmetric stress structure includes at least one stress layer conforming to the asymmetrical profile.

* * * * *